United States Patent [19]

Martensson

[11] Patent Number: 5,703,931
[45] Date of Patent: Dec. 30, 1997

[54] PORTABLE RADIO TELEPHONE WITH IMPULSE MOVEMENT OR SOUND OFF-HOOK PRODUCTION AND SIGNALLING

[75] Inventor: Nils Erik Vilhelm Martensson, Woking, England

[73] Assignee: Nokia Mobile Phones Limited, Espoo, Finland

[21] Appl. No.: 158,182

[22] Filed: Nov. 24, 1993

Related U.S. Application Data

[63] Continuation of Ser. No. 845,169, Mar. 3, 1992.

[30] Foreign Application Priority Data

| Mar. 6, 1991 | [GB] | United Kingdom | 9104707 |
| Mar. 21, 1991 | [GB] | United Kingdom | 9105964 |

[51] Int. Cl.⁶ .......................................... H04M 11/00
[52] U.S. Cl. .......................... 379/58; 379/61; 379/63
[58] Field of Search .................... 379/58, 59, 61, 379/63, 67, 88, 424, 80; 381/110

[56] References Cited

U.S. PATENT DOCUMENTS

| 4,130,731 | 12/1978 | Bolgiano | 379/58 |
| 4,737,976 | 4/1988 | Borth | 379/58 |
| 4,827,520 | 5/1989 | Zeinstra | 381/43 |
| 4,910,761 | 3/1990 | Shimura | 379/61 |
| 4,945,557 | 7/1990 | Kaneuchi et al. | 379/67 |
| 4,945,570 | 7/1990 | Gerson | 381/110 |
| 4,962,524 | 10/1990 | Murata | 379/63 |
| 4,998,291 | 3/1991 | Marui et al. | 379/58 |
| 5,029,198 | 7/1991 | Walpole et al. | 379/67 |
| 5,042,063 | 8/1991 | Sakamishi | 379/58 |
| 5,086,452 | 2/1992 | Ito et al. | 379/424 |
| 5,148,471 | 9/1992 | Metroke | 379/58 |
| 5,152,007 | 9/1992 | Uribe | 381/67 |
| 5,175,759 | 12/1992 | Metroka et al. | 379/61 |
| 5,233,644 | 8/1993 | Yamagata | 379/61 |
| 5,335,276 | 8/1994 | Thompson | 381/42 |

FOREIGN PATENT DOCUMENTS

| 0381214 | 8/1990 | European Pat. Off. . |
| 0381214A3 | 8/1990 | European Pat. Off. . |
| 2815057 | 10/1979 | Germany . |
| 0027999 | 5/1981 | Germany . |

OTHER PUBLICATIONS

Patent Abstracts of Japan JP62003546, vol. 011171, Jun. 1987.
Patent Abstracts of Japan, JP60229432, vol. 010082, Apr. 1986.
Vox on p. 1131 of 1990's Newton's Telecom Dictionary.
Japanese Abstracts (JP62003546), vol. 011171, Jun. 1987. (JPA 60229432), vol. 10082, Aopr. 1986.

Primary Examiner—Curtis Kuntz
Assistant Examiner—Vijay Shankar
Attorney, Agent, or Firm—Perman & Green, LLP

[57] ABSTRACT

A portable radio telephone operating under the control of a microprocessor includes a disturbance sensitive switch sensitive to shock, movement or other physical disturbance or to a voice which causes the telephone to go "off-hook" if the telephone is disturbed during an incoming call. The user can thus answer an incoming call very quickly before the system times-out the call by gently striking or simply moving the telephone or talking or shouting to it even when the telephone is in a relatively inaccessible location. In a preferred embodiment the user is required to confirm the off-hook condition by pressing one of the keys on the telephone keypad. The telephone may continue ringing until the confirmatory keystroke has been effected.

19 Claims, 4 Drawing Sheets

PORTABLE RADIO TELEPHONE WITH IMPULSE MOVEMENT OR SOUND OFF-HOOK PRODUCTION AND SIGNALLING

This is a continuation of copending application Ser. No. 07/845,169 filed on Mar. 3, 1992

This invention relates to a portable telephone, particularly but not exclusively a portable cellular radio telephone.

BACKGROUND OF THE INVENTION

There is a trend nowadays for portable radio telephone units to be increasingly lightweight and compact. This in conjunction with the fact that such units are cordless offers not only enhanced mobility but also true portability, so that the user can readily carry a portable radio telephone unit, for example in a pocket or briefcase, wherever he or she goes. Particularly in the case of cellular radio, this gives the user a very flexible and powerful means of communication, which can always be to hand.

When an incoming call is received by the telephone a call indicator is activated to alert the user to the fact that there is an incoming call. The call indicator may include an audible signal, e.g. a ring tone, and/or a visual signal, e.g. a message such as "CALL" may be flashed on a visual display panel. The call can be answered by the user depressing one of the keys on the telephone keypad which produces the so-called "off-hook" condition in the telephone.

A drawback with cellular telephone systems is that the system allows only a relatively short window of time before an incoming call is timed out, i.e. the incoming call is terminated by the system if the call is not answered within the pre-set time period. In practice this window of time may be as short as only 3-5 rings. This can be very frustrating for a user who intends to take an incoming call, but finds that he is unable to do so only because the telephone may be in a slightly inaccessible place. For example, when driving, the driver may have placed the telephone in an inside pocket of his jacket which he has hung up in the rear of the car. Alternatively for example, the driver may have put the telephone in a briefcase on the rear seat of the car. In either case, if the telephone rings while the subscriber is driving it may be very difficult to stop the car in a safe location, retrieve the telephone, and press a key to answer the call, within the short time allowed. Consequently the call will often be terminated by the system before the subscriber has had sufficient opportunity to take the call, although the intention was to answer it. Clearly this can be frustrating for both the caller and for the subscriber.

EP-A-0381214 discloses a telephone in which a touch sensitive portion is provided, for example, on an external surface of the telephone itself or at some other remote, but accessible, location. The user can answer the call simply by touching the sensor. However, it is necessary not only for the telephone to be accessible, but also for the user to be able to touch the exact location of the sensor, which would not be possible if the telephone were to be in a pocket or briefcase.

SUMMARY OF THE INVENTION

According to a first aspect of the present invention there is provided a portable telephone comprising means for sensing disturbance of the telephone, and means responsive to said disturbance sensing means for producing an off-hook condition in the portable telephone.

The disturbance sensing means may comprise, for example, a switch sensitive to shock, movement, or acceleration.

In accordance with a second aspect of the invention there is provided a portable telephone comprising voice sensing means, and means responsive to said voice sensing means for producing an off-hook condition in the portable telephone.

A portable radio telephone in accordance with the invention has the advantage that it is necessary merely to knock or hit the telephone, to move it suddenly, of to a different angle of inclination, or to call out or speak in the vicinity of the telephone in order for the telephone to go "off-hook" when the telephone is ringing or otherwise indicating an incoming call. Tapping the telephone or a briefcase in which the telephone is placed, taking the telephone out of the pocket, moving it from a horizontal to an inclined orientation or a spoken word or a shout will be enough to cause the telephone to go "off-hook".

The user can thus much more easily indicate his intention to take the call even when the telephone is in an inaccessible location such as an inside jacket pocket or inside the briefcase. A call can therefore be answered much more easily within the period of time allowed by the system.

In a preferred embodiment the means for producing the off-hook condition responsive to said disturbance sensing means or voice sensing means are not operable the whole time but only during an incoming call. Otherwise there would be a risk that the telephone would go off-hook even when there was no incoming call and this would cause the telephone to become "busy" or "engaged" when this condition was not intended.

Suitably the telephone is adapted to continue ringing or otherwise indicating the presence of an incoming call until the user confirms that the off-hook condition is required (i.e. confirms his intention to answer the call) e.g. by depressing one of the keys provided on the telephone keypad.

If confirmation is not provided within a predetermined period of time the telephone may revert to the on-hook condition and therefore terminate the incoming call. In this case the telephone has in essence extended the window of time in which an incoming call must be answered from the relatively short time imposed externally by the system to a longer time imposed locally within the telephone instrument itself.

BRIEF DESCRIPTION OF THE DRAWINGS

The invention will now be described, by way of example, with reference to the accompanying drawings, in which.

DETAILED DESCRIPTION OF THE INVENTION

Figure 1:
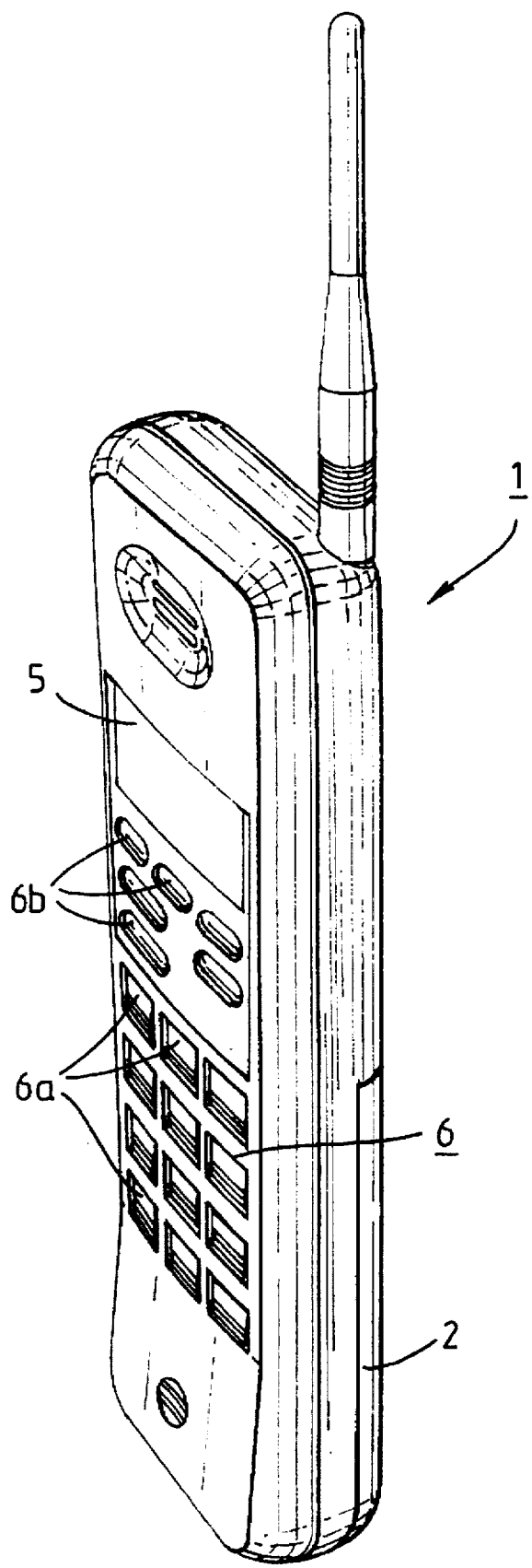
FIG. 1 is a perspective view of a portable cellular telephone in accordance with the invention.

The portable radio telephone shown in FIG. 1 is a cellular telephone i powered by a rechargeable battery pack 2. The telephone 1 includes a transceiver and all the other features conventionally found in a cellular telephone, as shown schematically in FIGS. 2 and 3. Also, since these aspects of the telephone are not directly relevant to the instant invention no further details will be given here, except to say that a single microprocessor 4 (see FIG. 2 and 3) is employed to control all the basic functions of the telephone 1 and to control the keypad and display functions. Alternatively, however, the telephone functions may be controlled by a master microcomputer, while the keypad and display functions are under the control of a separate slave microcomputer coupled to communicate with the master microcomputer.

The user-interface of telephone 1 comprises a display, e.g. a liquid crystal display 5, itself well-known in the art and a keypad 6 on the front of the telephone 1. The display is coupled to and regulated by the microprocessor 4 in the usual manner. The keypad 6 essentially comprises two main sets of keys, namely alpha numeric keys 6a associated with alpha numeric data especially for dialling telephone numbers, but also (optionally) for entering alphanumeric data into the telephone memories, e.g. a subscriber number index, and a set of function keys 6b for enabling various predetermined functions or operations. The keys 6a are arranged in four rows of three keys each. As is conventional for the numeric key layout of a telephone, the top row comprises keys for numbers 1, 2 and 3 respectively, the second row down for numbers 4, 5 and 6 respectively, the next row down for numbers 7, 8 and 9 respectively, and the bottom row for *, 0 and # respectively. Some or all of these keys may also be associated with alphabet information, as again is quite conventional. The alphabetic rather than numeric data is selected for example by preceding the alphanumeric keystroke with another predetermined keystroke or set of keystrokes, specifically using the function keys. Hence the alphabetic data mode may be enabled for example by preceding the particular keystroke with previously depressing a "MEMORY" or "STORE" key disposed among the function keys 6b.

As is usual in cellular telephones, the keys 6b include a "SEND" and "END" key for respectively initiating and terminating a telephone call. Another key, specifically located in the top left-hand corner is an "ON/OFF" key for turning the telephone on and off, i.e. by connecting and disconnecting the battery pack power supply. Another of the function keys may be a menu or function key labelled, for example, "MENU" or "FUNCTION" or with a suitable abbreviation thereof. Depression of this key enables a variety of pre-set menus, the related instructions of which are stored in memory, to be viewed and selectively enabled. The various menus are selected by depressing the appropriate alphanumeric keys after depressing the "MENU" or "FUNCTION" key. The relevant menu is shown to the user in words or abbreviations on the display panel 5. For example, the user may be able to select the ringing tone by appropriate menu selection. More sophisticated options may also be available via the menu facility. For example, the user may be able to enable the so-called Discontinuous Transmission mode which employs a voice activated switch which helps to reduce battery drain by transmitting only when speech is input to the microphone.

In accordance with the present invention the telephone additionally comprises a disturbance sensitive switch SW, 9 having one terminal coupled to a reference voltage source V and the other terminal coupled to the microprocessor 4.

In a first embodiment, the disturbance sensitive switch may be any suitable commercially available switch SW which is sensitive to shock or vibration or to any other movement or acceleration and is coupled to the microprocessor via a resistor R. The signal conveyed to the microprocessor will indicate whether the telephone is undisturbed in which case the switch SW will remain open, or whether the telephone is subject to any physical disturbance, e.g. the telephone has been physically tapped, struck or moved. The microprocessor 4 will respond accordingly as discussed in more detail below.

In a second embodiment, the disturbance sensitive switch may be a voice operated switch VOX 9. The voice operated switch 9 may be any suitable commercially available device and may indeed be the same device used in connection with the Discontinuous Transmission mode mentioned above. The signal conveyed by the VOX9 to the microprocessor will indicate whether or not the VOX 9 has been actuated by the presence of a voice. The microprocessor 4 will respond accordingly as discussed in more detail below.

Figure 2:
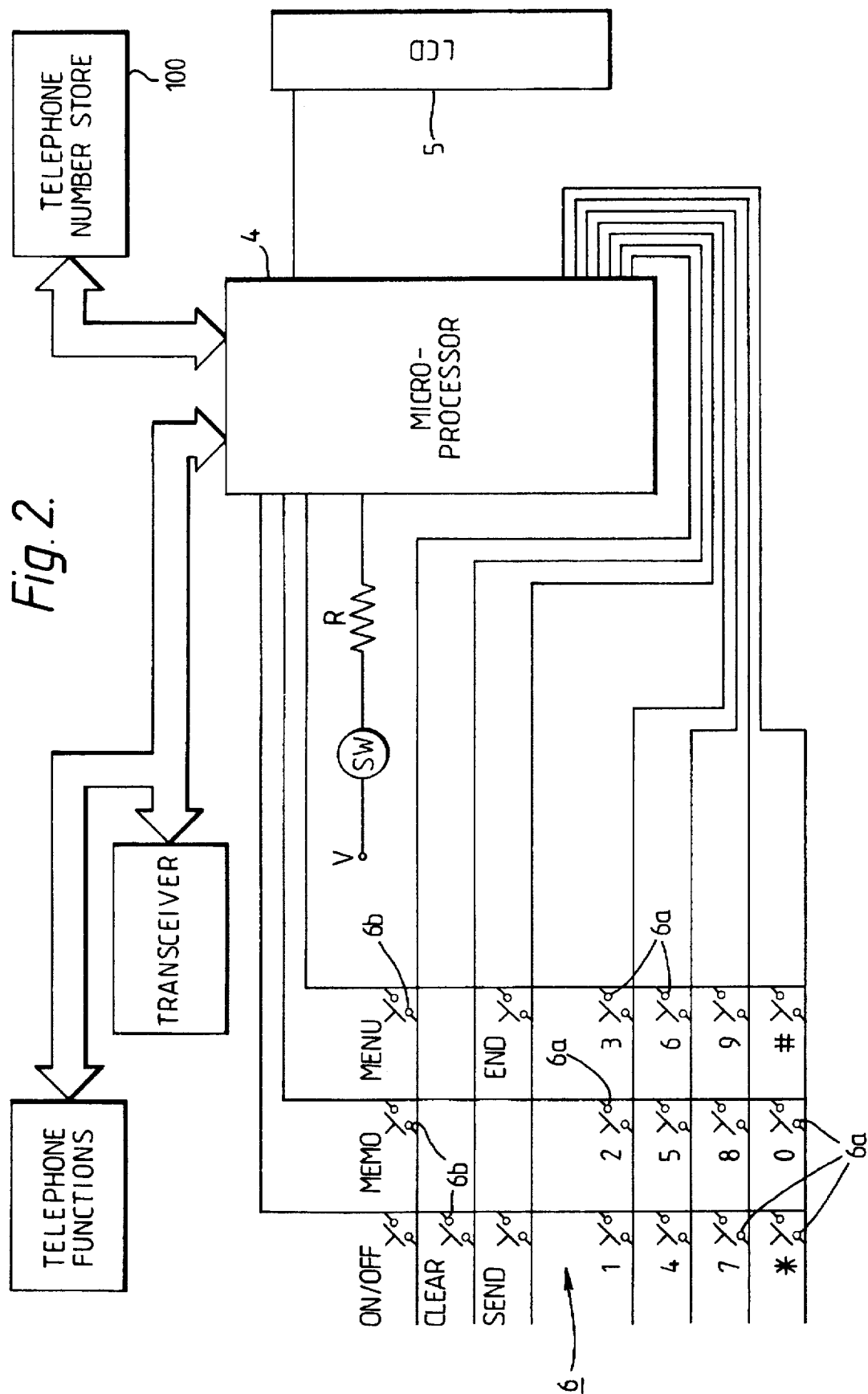
FIG. 2 is a schematic diagram of the keypad and microprocessor employed in the telephone in FIG. 1 in accordance with a first embodiment of the invention.
Figure 3:
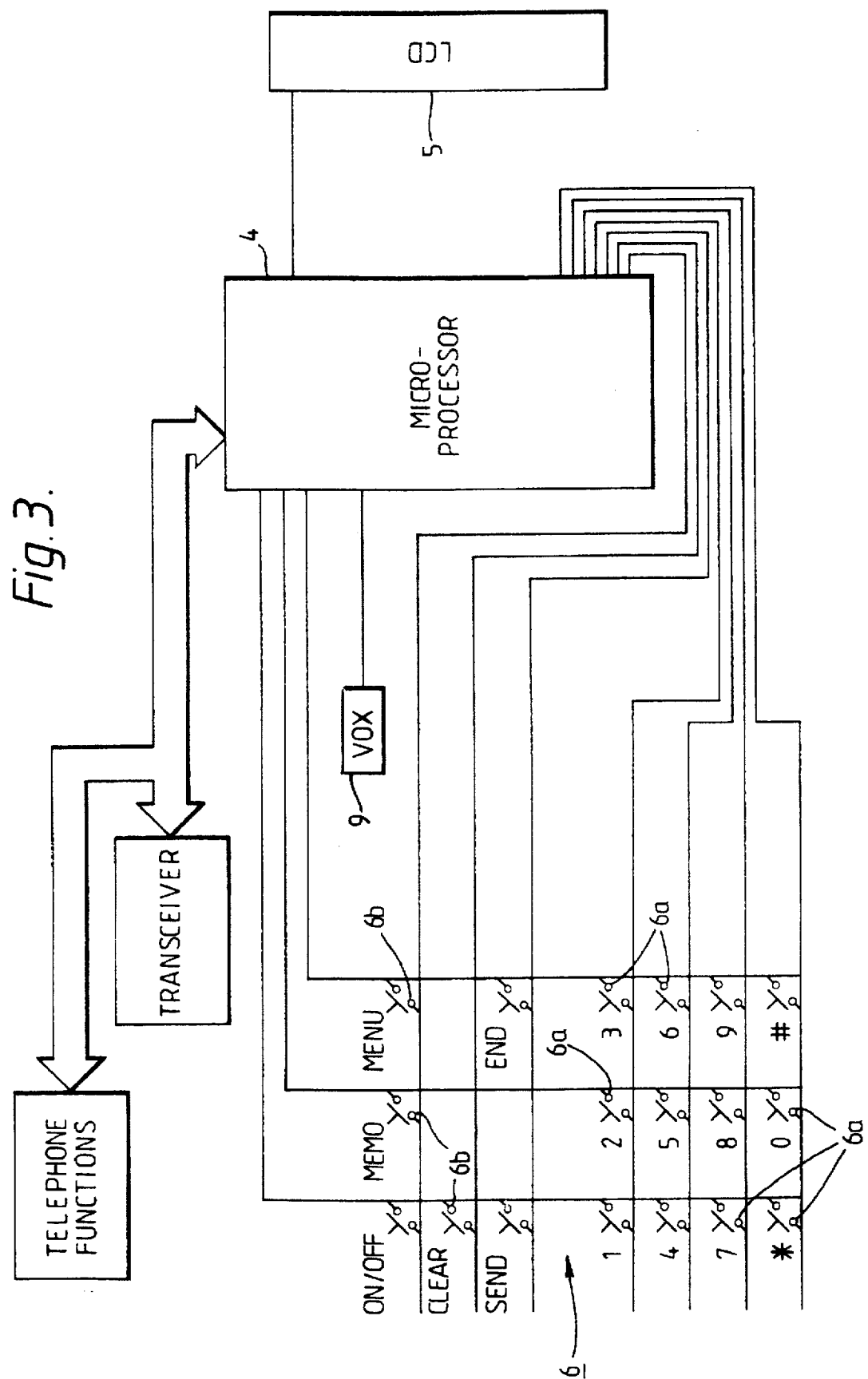
FIG. 3 is a schematic diagram of the keypad and microprocessor employed in the telephone in FIG. 1 in accordance with a second embodiment of the invention.
Figure 4:
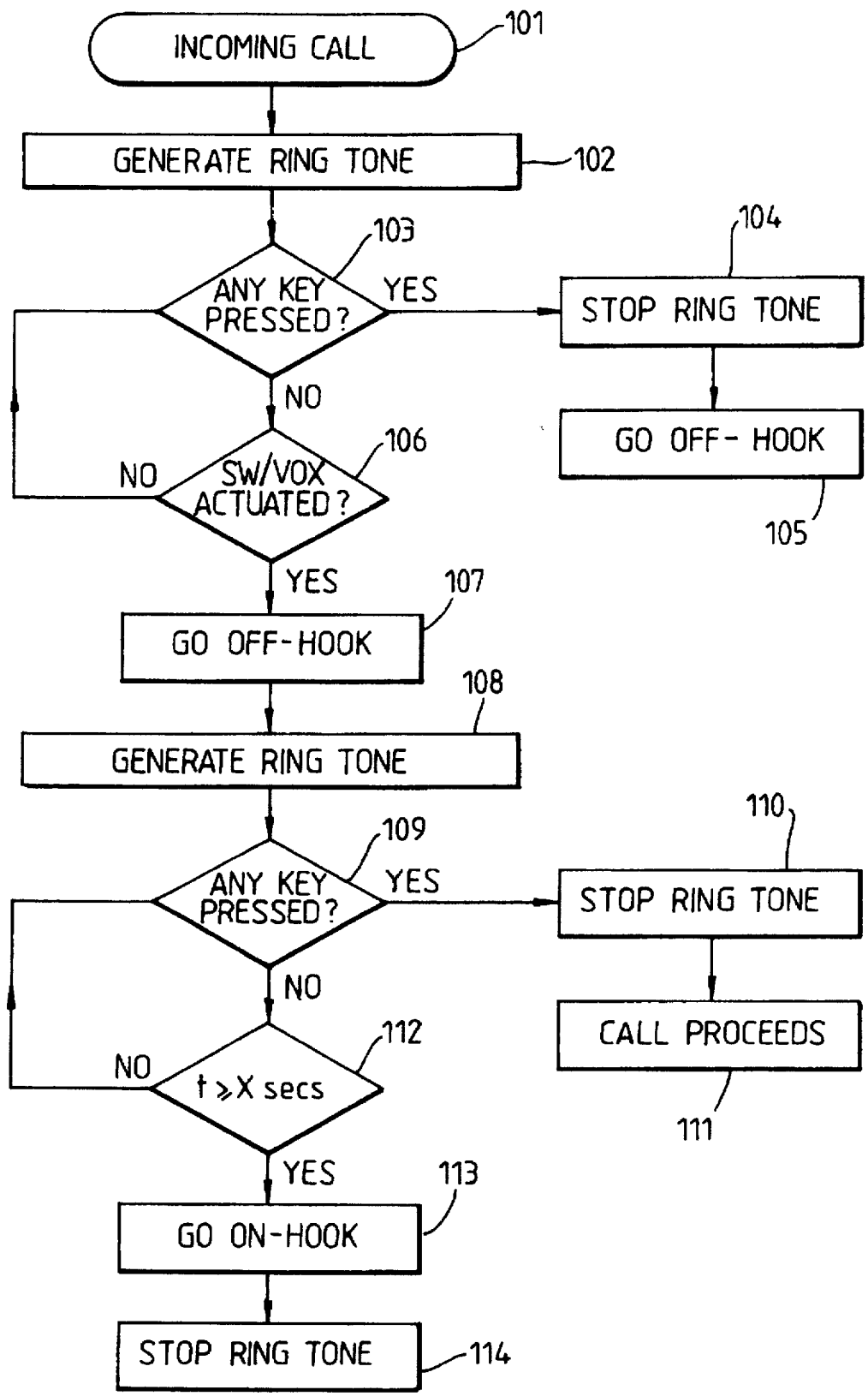
FIG. 4 is a flowchart depicting a set of steps used by the microprocessor process in producing an off-hook condition in response to an incoming call in accordance with the present invention.

FIG. 4 is a flowchart which may be used to implement the operation of the microprocessor 4 of FIGS. 2 and 3 in relation to producing an off-hook condition in response to an incoming call. The flowchart begins at block 101 when the portable telephone receives an incoming call. At block 102, in response to the reception of an incoming call, the telephone indicates the presence of the incoming call specifically by generating an audible ringing tone optionally accompanied by a visual indication. For example the message "CALL" may be displayed intermittently on the liquid crystal display 5.

If a key 6a, 6b is pressed within the time allowed by the system for the call to proceed, see block 103, the flow will proceed from block 103 to block 104 at which the ringing tone is stopped, and the telephone goes into the "off-hook" condition at block 105. The telephone call may now proceed. The operation thus far is conventional for a cellular telephone.

If none of the keys 6a, 6b is pressed at block 103 flow proceeds to block 106. If the switch SW or VOX 9 is not actuated the flow proceeds back to block 103 to check whether any of the keys 6a, 6b have been actuated. If none-of the keys 6a, 6b nor the switch SW or VOX 9, are actuated during the system time-out period the call will be terminated by the system in the usual manner.

On the other hand, if the switch SW or VOX 9 is actuated ie it does sense movement or shock or a voice within the time-out period, e.g. the telephone is physically tapped or moved or inclined from its resting location, or is shouted at, the flow proceeds from block 106 to block 107.

The telephone goes into the "off-hook" condition and at block 108 a local ringing tone is generated to indicate to the user that the incoming call still needs to be confirmed. Additionally a visual call indication may be given. Generating a ringing tone after the telephone has gone "off-hook" is unusual because the call has in a sense already been answered. However, it is possible that the telephone may have gone into the off-hook condition accidentally, for example if the telephone were subjected to ambient shock or movement or someone was speaking at the time an incoming call is received. Therefore, to warn the user that confirmation of the off-hook condition is still required the ringing tone continues until a key is pressed, see block 109, when the flow proceeds to block 110 where the ringing tone is stopped and then the call may proceed in the conventional manner, see block 111.

It is noted here that the ringing tone generated after the telephone has gone off-hook i.e. at block 108, may be different in character to that generated at block 102 in order to indicate to the user that whatever action he has taken, e.g.

gently striking the telephone, inclining the telephone or shouting at the telephone, at block 106 has successfully produced the off-hook condition, and that it is merely confirmation of the off-hook condition which is required for the call to proceed.

Also, it may be arranged for the caller to hear the locally generated ringing tone so as to indicate to the caller that the call has in effect only been partially answered, and that confirmation of the off-hook condition by the receiving subscriber is still required before the call will proceed in the conventional manner. Additionally or alternatively the telephone may be adapted to provide a special pre-recorded message to the caller to indicate when the telephone is in an unconfirmed "off-hook" condition, inviting the caller to hold the line until confirmation has been given by the subscriber at which point the call may proceed in the usual manner.

If no key is pressed at block 109 flow proceeds to block 112. If the time interval since SW/VOX actuation (see block 106) is less than a preset time of X seconds, e.g. 30 seconds, flow returns to block 109 to continuously monitor whether a confirmatory key has been depressed. However, if the time limit of X seconds is reached and no confirmatory key is pressed the telephone will hang up by reverting to the on-hook condition at block 113 thereby terminating the incoming call and also stopping the ring tone at block 114 so that the user is alerted to the fact that the call has been terminated.

In view of the foregoing description it will be evident to a person skilled in the art that various modifications may be made within the scope of the present invention.

I claim:

1. A portable telephone comprising:
   means for sensing physical disturbance of the telephone, the means for sensing disturbance including an orientation insensitive acceleration switch activated by impulsive accelerative movement of the telephone; and
   means, responsive to said disturbance sensing means, for producing an off-hook condition in the portable telephone upon a predetermined impulsive accelerative movement of the telephone.

2. A portable telephone as claimed in claim 1, wherein the means for producing an off-hook condition responsive to said disturbance sensing means are operable to produce said off-hook condition responsive to the disturbance sensing means only during an incoming call.

3. A portable telephone as claimed in claim 1 further comprising means manually actuable by the user for confirming that the off-hook condition is required.

4. A portable telephone as claimed in claim 3 comprising a main body portion having a plurality of individually actuable keys, wherein actuation of one of said keys confirms that the off-hook condition is required.

5. A portable telephone as claimed in claim 1, further comprising:
   means for indicating an incoming call, and
   means for activating the call indicating means while an incoming call remains unanswered.

6. A portable telephone as claimed in claim 5, wherein the activating means are operable also to activate the call indicating means when an off-hook condition is produced responsive to said disturbance sensing means.

7. A portable telephone as claimed in claim 6, wherein activation of said call indicating means is terminated when a predetermined period of time has elapsed after the off-hook condition is produced responsive to said disturbance sensing means, or when said off-hook confirming means have been actuated, whichever is the earlier.

8. A portable telephone as claimed in claim 7, adapted to produce an on-hook condition when said predetermined period of time has elapsed after the off-hook condition has been produced responsive to said disturbance sensing means.

9. A portable radio telephone as claimed in claim 1 wherein the means for sensing disturbance includes means for sensing change of orientation of the telephone.

10. A portable telephone comprising:
    means for sensing an impulse motion applied to the telephone, the means for sensing being activated by the impulse motion of the telephone regardless of the orientation of the telephone; and
    means, responsive to said impulse sensing means, for producing an off-hook condition in the portable telephone upon an impulse being applied to the telephone.

11. A portable telephone as claimed in claim 10, wherein the means for producing an off-hook condition are operable to produce said off-hook condition responsive to the impulse motion sensing means only during an incoming call.

12. A portable telephone as claimed in claim 10 further comprising means, manually actuable by a user, for confirming that the off-hook condition is required.

13. A portable telephone as claimed in claim 12 comprising a main body portion having a plurality of individually actuable keys, wherein actuation of one of said keys confirms that the off-hook condition is required.

14. A portable telephone as claimed in claim 10, further comprising:
    means for indicating an incoming call; and
    means for activating the call indicating means while an incoming call remains unanswered.

15. A portable telephone as claimed in claim 14, wherein the activating means are operable also to activate the call indicating means when an off-hook condition is produced responsive to said impulse motion sensing means.

16. A portable telephone as claimed in claim 15, wherein activation of said call indicating means is terminated when a predetermined period of time has elapsed after the off-hook condition is produced responsive to said impulse motion sensing means, or when said off-hook confirming means have been actuated, whichever is the earlier.

17. A portable telephone as claimed in claim 16, adapted to produce an on-hook condition when said predetermined period of time has elapsed after the off-hook condition has been produced responsive to said impulse motion sensing means.

18. A portable radio telephone as claimed in claim 10, wherein the means for producing an off-hook condition also includes means for sensing change of orientation of the telephone.

19. A method of producing an off-hook condition in a portable telephone comprising steps of:
    providing the portable telephone with means for sensing physical disturbance of the telephone including an orientation insensitive switch sensitive to impulse accelerative movement and, means responsive to said switch for producing an off-hook condition in the portable telephone; and
    moving the portable telephone with a predetermined impulsive accelerative movement to produce the off-hook condition.

* * * * *